United States Patent
Nakazawa (10) Patent No.: US 6,848,890 B2
(45) Date of Patent: Feb. 1, 2005

(54) PUMP ASSEMBLY

(75) Inventor: Chiharu Nakazawa, Kawasaki (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 32 days.

(21) Appl. No.: 10/347,467

(22) Filed: Jan. 21, 2003

(65) Prior Publication Data

US 2003/0138333 A1 Jul. 24, 2003

(30) Foreign Application Priority Data

Jan. 23, 2002 (JP) ......................................... 2002-014682

(51) Int. Cl.[7] .............................. F01B 1/00; F04B 35/04; F16C 27/00
(52) U.S. Cl. ...................... 417/410.1; 92/147; 384/535
(58) Field of Search .................... 417/470, 310, 417/312, 366, 273, 410.1; 92/143, 172, 162 R, 85 E, 129, 147; 384/535

(56) References Cited

U.S. PATENT DOCUMENTS

| | | | | |
|---|---|---|---|---|
| 4,920,859 A | * | 5/1990 | Smart et al. .................. | 91/497 |
| 5,039,283 A | * | 8/1991 | Mergenthaler et al. ...... | 417/273 |
| 5,839,349 A | * | 11/1998 | Volz ............................... | 92/47 |
| 6,215,215 B1 | * | 4/2001 | Huber et al. ................... | 310/89 |
| 6,582,203 B2 | * | 6/2003 | Herrmann et al. ........... | 417/273 |

FOREIGN PATENT DOCUMENTS

| | | | | |
|---|---|---|---|---|
| DE | 4336673 A1 | * | 5/1995 | ............. F04B/1/04 |
| JP | 6-61637 U | | 8/1994 | |

* cited by examiner

Primary Examiner—Michael Koczo
(74) Attorney, Agent, or Firm—Foley & Lardner LLP

(57) ABSTRACT

A pump assembly is provided which comprises a pump housing, an electric motor attached to the pump housing and having a casing and an output shaft that protrudes into the pump housing to drive a pump within the pump housing, the output shaft having at least two supported portions by way of which the output shaft is rotatably supporting on the casing and the housing, respectively, and an elastic device interposed between one of the supported portions and one of the casing and the pump housing for damping radial vibrations of the output shaft.

17 Claims, 6 Drawing Sheets

INVENTION

FIG.5B

EARLIER TECHNOLOGY

PUMP ASSEMBLY

BACKGROUND OF THE INVENTION

The present invention relates to a pump assembly for a brake system that executes so-called antilock brake control or active brake control and more specifically to a support structure of a pump assembly for supporting an output shaft of an electric motor.

A brake system heretofore known includes a brake unit disposed between a wheel cylinder and a master cylinder and has an antilock brake function for preventing wheel lock and wheel slip. Further, the brake system with such a brake unit has come to perform, in addition to the antilock brake function, various other functions such as a traction control function, stability control function for obtaining a vehicle running stability and a brake assist function for assisting a braking effort of a driver.

The brake system having the above-described functions has a pump assembly including a metal housing within which brake fluid passages, a pump, etc. are disposed and an electric motor that is attached to an end surface of the housing for driving the pump and thereby controlling increase and decrease of brake fluid.

An example of a pump assembly described above is disclosed in Japanese Utility Model Provisional Publication No. 6-61637.

SUMMARY OF THE INVENTION

A pump assembly having a pump drive motor attached to a pump housing has a problem of vibration and sound.

It is accordingly an object of the present invention to provide a pump assembly of the type having a motor attached to a pump housing, which can reduce vibration and sound and the same time can attain a good assembling efficiency.

To accomplish the above object, there is provided according to an aspect of the present invention a pump assembly comprising a pump housing, an electric motor attached to the pump housing and having a casing and an output shaft that protrudes into the pump housing to drive a pump within the pump housing, the output shaft having at least two supported portions by way of which the output shaft is rotatably supported on the casing and the pump housing, respectively, and a damping device interposed between one of the supported portions and one of the casing and the pump housing for damping radial vibrations of the output shaft.

According to another aspect of the present invention, there is provided a pump assembly comprising a pump housing, a pump disposed within the pump housing, an electric motor attached to the pump housing and having a casing and an output shaft that protrudes into the pump housing to drive the pump, a bearing unit for rotatably supporting at least two support portions of the output shaft on the pump housing and the casing, respectively and an elastic device interposed between the bearing unit and one of the pump housing and the casing for damping radial vibrations of the output shaft.

The other objects and features of this invention will become understood from the following description with reference to the accompanying drawings.

DESCRIPTION OF THE PREFERRED EMBODIMENTS

For better understanding of the present invention, description is first made as to a pump assembly disclosed by Japanese Utility Model Provisional Publication No. 6-61637.

Figure 7:
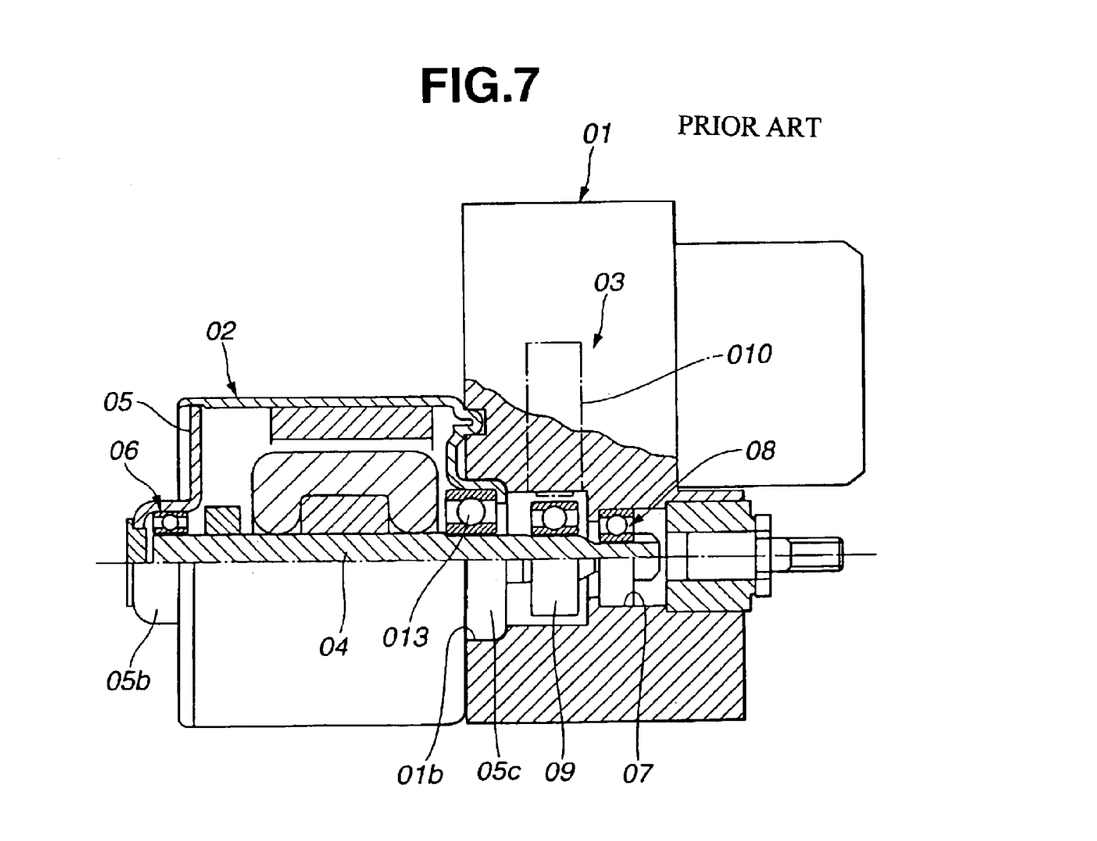
FIG. 7 is a pump assembly according to an earlier technology.

As shown in FIG. 7, the pump assembly includes pump housing 01 and electric motor 02 attached to pump housing 01 to constitute an integral unit. Motor 02 has output shaft 04 and casing 05. A base end portion of output shaft 04 is supported on support portion 05b of casing 05 by way of bearing 06. Another end portion of output shaft 04 is rotatably supported in shaft receiving hole 07 of pump housing 01 by way of bearing 08. Further, at an axial end of casing 05 for contact with pump housing 01 is provided support portion 05c that is received in motor attaching portion 01b and supports an intermediate portion of output shaft 04 by way of bearing 013.

Output shaft 04 has eccentric cam 09 that is located between bearing 08 and bearing 013. At an outer periphery of cam 09 is disposed a pair of plungers 010 whose axes extend so as to cross the axis of output shaft 04 at right angles.

Plungers 010 constitute pump 03 and are reciprocally disposed in cylinder chambers (not shown) formed in pump housing 01 so as to execute intake and discharge actions within the cylinders.

Generally in a pump assembly for a brake system that executes the above-described antilock brake control, etc., a plunger pump having a pair of cylinders that are radially disposed opposite to each other. In such a two-cylinder plunger pump, the plungers are different in phase by 180 degrees so that one plunger performs a discharge action when the other plunger performs an intake action. When one plunger comes to perform a discharge stroke in response to rotation of a cam, the cam pushes plunger upward against the bias of a spring. This causes the output shaft to incline under the influence of the spring force. As a result, there occur vibrations of the output shaft and sound accompanied by the same.

For preventing such vibration and sound, in the pump assembly of the above-described Japanese Utility Model Publication, the base end portion and another end portion of output shaft 04 are supported by way of bearings 06, 08 upon casing 02 and pump housing 01, i.e., output shaft 04 is supported at both ends.

However, when motor 01 is actually installed on pump housing 01, there occurs a great difficulty in attaining axial alignment of shaft receiving hole 07 of pump housing 01, support portion 05b of casing 05 and bearings 06, 08, 013 in assembly.

Accordingly, it is actually necessitated to provide between shaft receiving hole 07 and bearing 08 or between bearing 08 and output shaft 04 a clearance for absorbing the possible dimensional error. For this reason, when output shaft 04 is subjected to a radial load as mentioned above, vibrations of output shaft 04 are caused due to the clearance and therefore it has been difficult to prevent output shaft from causing vibrations of small amplitude.

Further, in a brake control system that actively produces a braking force irrespective of a braking operation of a driver for executing a vehicle behavior control, traction control, etc., a high torque (high rotation) motor is utilized for obtaining a quick response. In such a brake control system, it is further required to reduce vibration and sound caused thereby.

Figure 1:
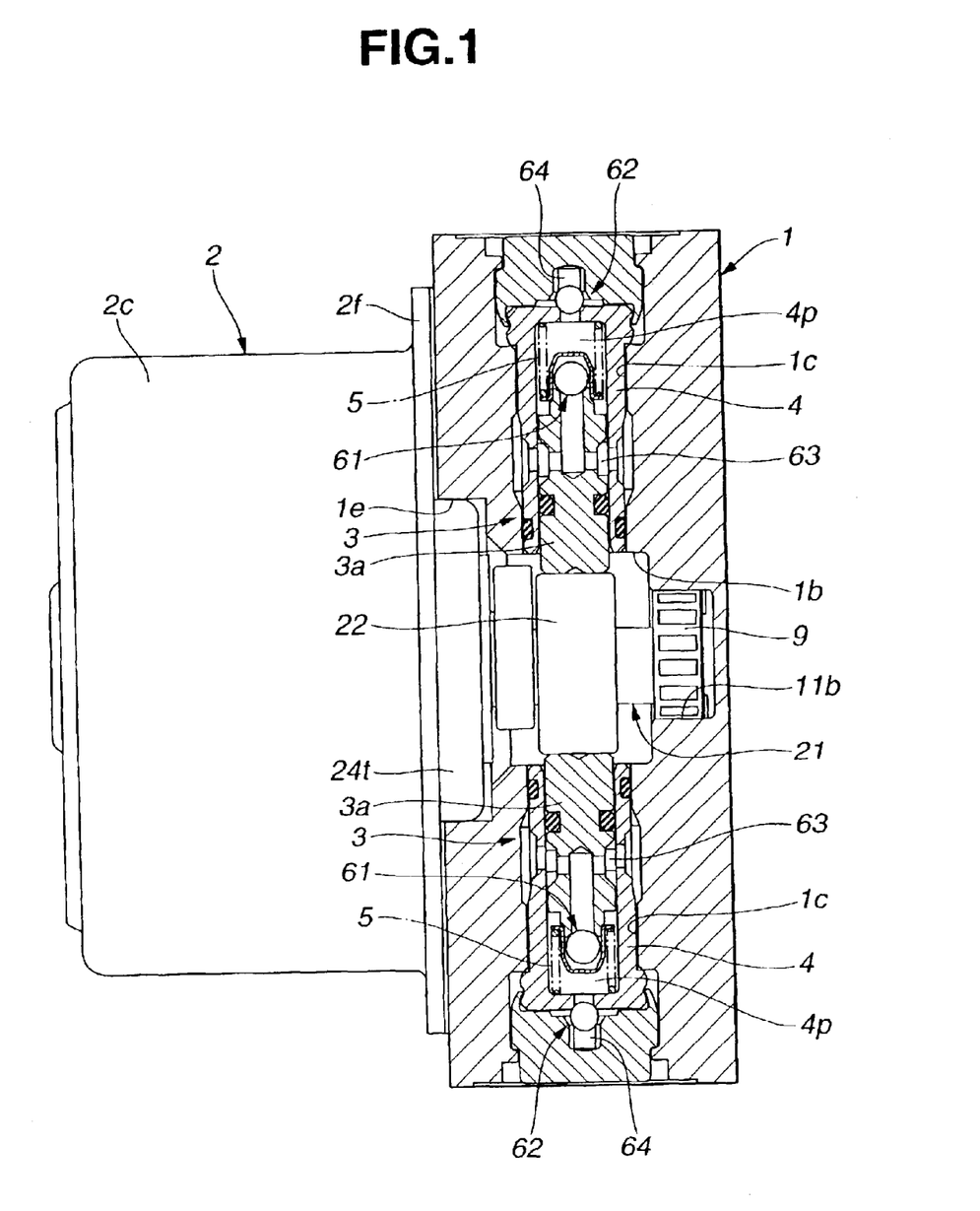
FIG. 1 is a partly sectional, side elevation of a pump assembly according to an embodiment of the present invention.

Referring now to FIG. 1, a pump assembly according to an embodiment of the present invention includes pump housing 1 that is made of made of metal or resin and formed into a nearly rectangular parallelepiped. Pump housing 1 has shaft receiving hole 1b that extends horizontally in the drawing. On the upper and lower sides of shaft receiving hole 1b are provided pump holes 1c whose axes extend so as to cross the axis of shaft receiving hole 1b at right angles.

Figure 4:
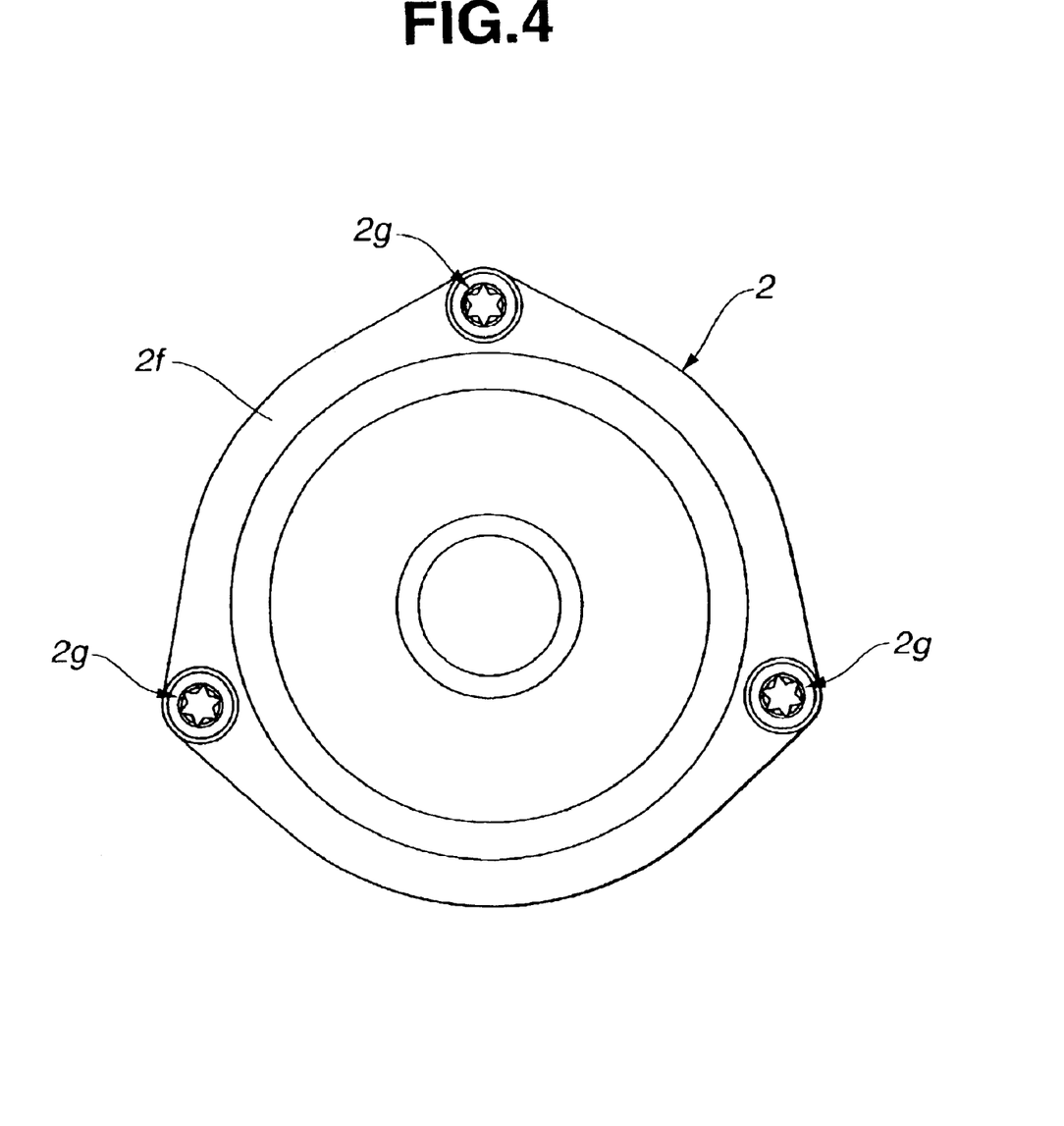
FIG. 4 is an elevation of a motor section of the pump assembly of FIG. 1.

Electric motor is indicated by 2 and has casing 2c made of metal or resin. Casing 2c is in the form of a cup or hat and has at an open end thereof radially outward flange 2f that is secured at three places to pump housing 1 by means of bolts 2g (refer to FIG. 4).

Pump 3 has output shaft 21 that protrudes from casing 2c into shaft receiving hole 1b of pump housing 1.

At an intermediate portion of output shaft 21 is provided eccentric cam 22. Abuttingly engaged with the outer periphery of eccentric cam 22 are plungers 3a of pump 3 that are axially movably supported in pump holes 1c.

More specifically, plungers 3a are slidably disposed in cylinders 4 that are in turn tightly fitted in pump holes 1c. Plungers 3 are urged by springs 5 in the direction for contact with eccentric cam 22.

Further, at an end of each plunger 3 is provided suction valve 61 that has a one-way valve structure and opens upon suction stroke. At the bottom of each cylinder 4 is provided discharge valve 62 that has a one-way valve structure and opens upon discharge stroke.

Accordingly, the pump assembly of this embodiment is structured such that when output shaft 21 is driven to rotate by electric motor 2, plungers 3 are caused to reciprocate up and down in the drawing by being pushed by eccentric cam 22.

When movement of plunger 3 causes pump chamber 4p defined between the end of plunger 3 and the bottom of cylinder 4 to increase, suction valve 61 opens, thus allowing brake fluid such as brake oil to be suctioned from passage 63 into pump chamber 4p or on the contrary when movement of plunger 3 causes pump chamber 4p to decrease in volume, discharge valve 62 opens, thus allowing fluid to be discharged from pump chamber 4p into passage 64.

Figure 2:
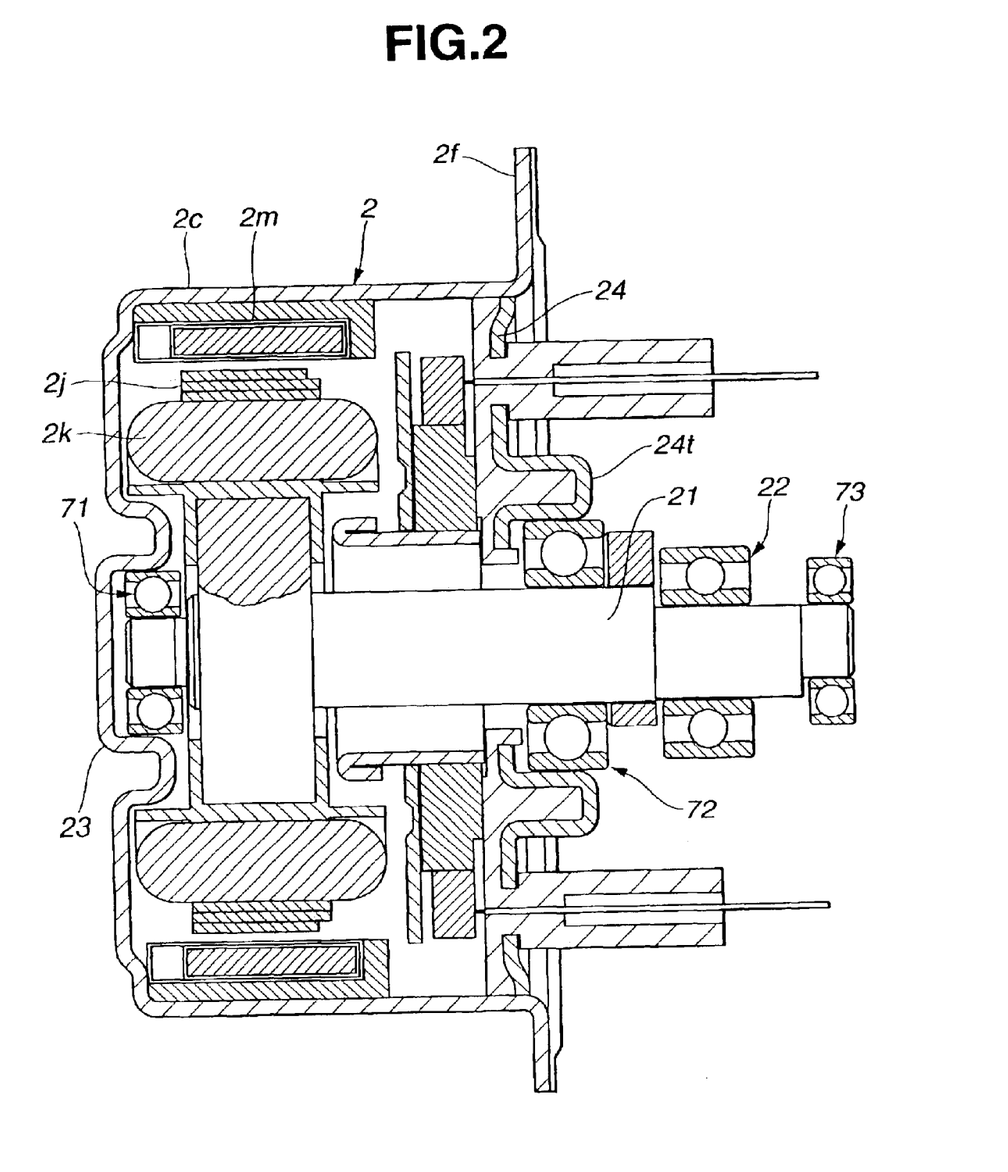
FIG. 2 is an enlarged sectional view of a pump section of the pump assembly of FIG. 1.

Then, referring to FIG. 2, the structure of electric motor 2 and the support structure of output shaft 21 will be described.

On the inner circumferential periphery of casing 2c of motor 2 is installed magnet retainer 2m. At an axial position corresponding to magnet retainer 2m, output shaft 21 has mounted thereon core 2j on which coil 2k are wound. Core 2j and coil 2k are disposed inside magnet retainer 2m.

On the base end portion of output shaft 21 that constitutes a support portion is installed rear bearing 71 that is made up of a ball bearing. On the intermediate portion of output shaft 21 that constitutes a support portion is installed front bearing 72 that is made up of a ball bearing. On the protruded end portion of output shaft 21 that constitutes a support portion is installed terminal bearing 73 that is made up of a ball bearing.

In the meantime, above-described eccentric cam 22 is constituted by a ball bearing that is installed on an eccentric shaft portion of output shaft 21.

To a closed axial end of casing 2c (i.e., an axial end opposite to the above-described flanged open end or opposite to pump housing 1) is provided support portion 23 in the form of a cuplike projection. Above-described rear bearing 71 is fittingly installed in support portion 23 to be retained by the same.

Further, at the open or flanged axial end of casing 2c (i.e., the end for attachment to pump housing 1) is provided front cover 24. Front cover 24 has at the central portion thereof annular protrusion 24t having concentric inner and outer circumferential peripheries. Shaft receiving hole 1b has at an open end thereof larger diameter hole section 1e in which protruded portion 24t of front cover 24 is fittingly installed in the manner as to have the outer circumferential periphery thereof engaged with the inner circumferential periphery of hole section 1e (refer to FIG. 1). With the inner circumferential periphery of protruded portion 24t is fittingly engaged the outer circumferential periphery of front bearing 72 and is thereby supported by the same.

To the protruded end portion of output shaft 21 is provided terminal bearing 73 that constitutes a supported portion of output shaft 21. On the outer circumferential periphery of terminal bearing 73 is installed split cylindrical spring 9 that constitutes a damping or elastic means.

Figure 3A:
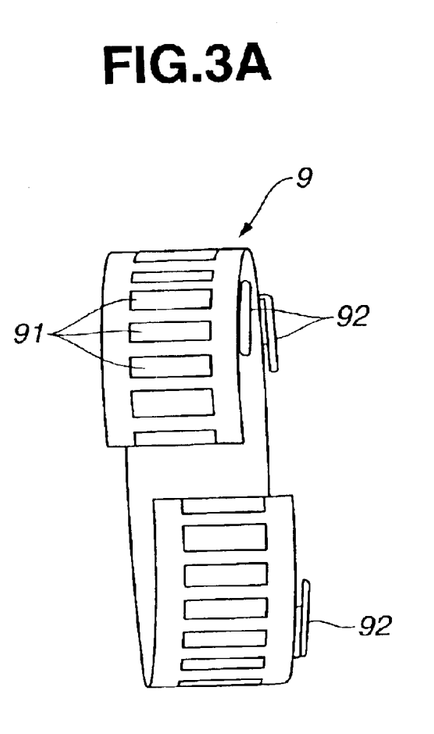
FIG. 3A is a side elevation of a split cylindrical spring that constitutes a damping or elastic means of the pump assembly of FIG. 1.
Figure 3B:
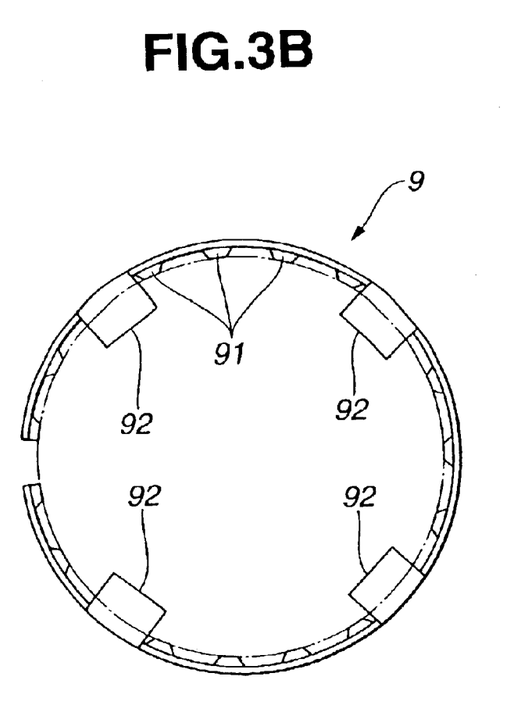
FIG. 3B is an elevation of the cylindrical spring of FIG. 3B.

As shown in FIGS. 3A and 3B, cylindrical spring 9 is in the form of a split ring and formed of a rectangular band. Cylindrical spring 9 has a number of radially inward projections 91. Further, cylindrical spring 9 has at one axial end four fingers 92 that axially engaged with an axial end surface of terminal bearing 73 so as to limit relative axial movement therebetween. As shown in FIG. 1, cylindrical spring 9 is fitted in support hole section 11b that constitutes part of shaft receiving hole 1b and is positioned most inside of pump housing 1.

In the thus structured pump assembly of this embodiment, output shaft 21 is supported on casing 2c and pump housing 1 at three places, i.e., at the base end portion, intermediate portion and protruded end portion, by way of bearings 71, 72, 73 such that vibrations of output shaft 21 in the direction perpendicular to the axis thereof, i.e., radial vibrations can be prevent assuredly and efficiently.

Further, since cylindrical bearing 9 is interposed between the outer circumferential periphery of terminal bearing 73 and pump housing 1, there can be formed between the outer circumferential periphery of terminal bearing 73 fitted on output shaft 21 and the inner circumferential periphery of support hole 11b a clearance for absorbing an error in the dimension in the direction perpendicularly to the axis of output shaft 21 thereby absorbing deviation of the axes of casing 2c, pump housing 1 and output shaft 21 from each other and making it possible to attain an improved assembly work. Namely, cylindrical spring 9 can fill up the above-described clearance by elastic deformation of projections 91 and prevent output shaft 12 from vibrating perpendicularly to the axis thereof, i.e., radially, and even when output shaft 21 vibrates perpendicularly to the axis thereof, such vibrations can be dampened by cylindrical spring 9, thus making it possible to prevent vibration and sound of the pump assembly.

Figure 5A:
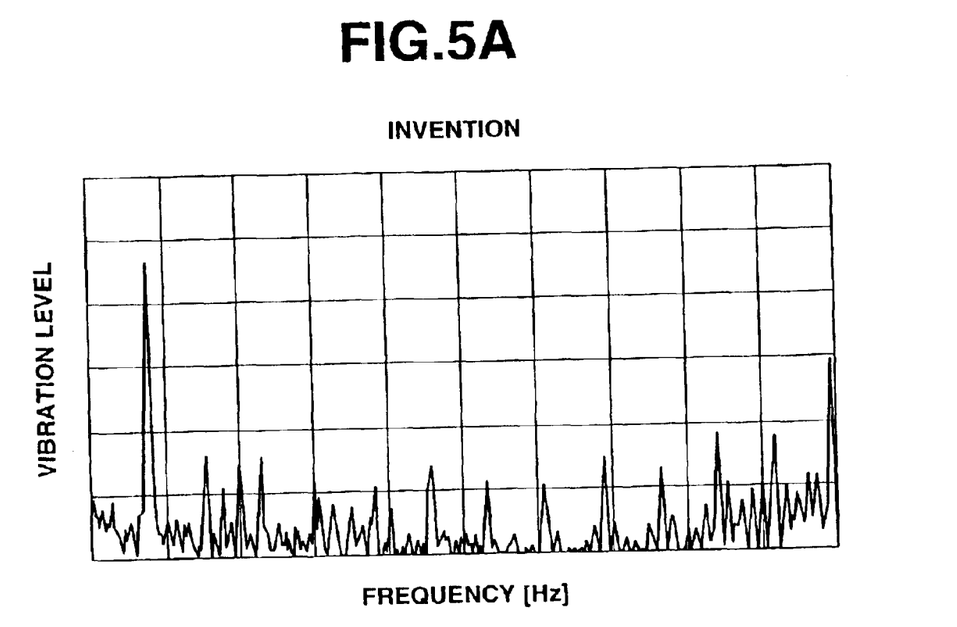
FIG. 5A is a graph showing vibration characteristics of the pump assembly of FIG. 1.
Figure 5B:
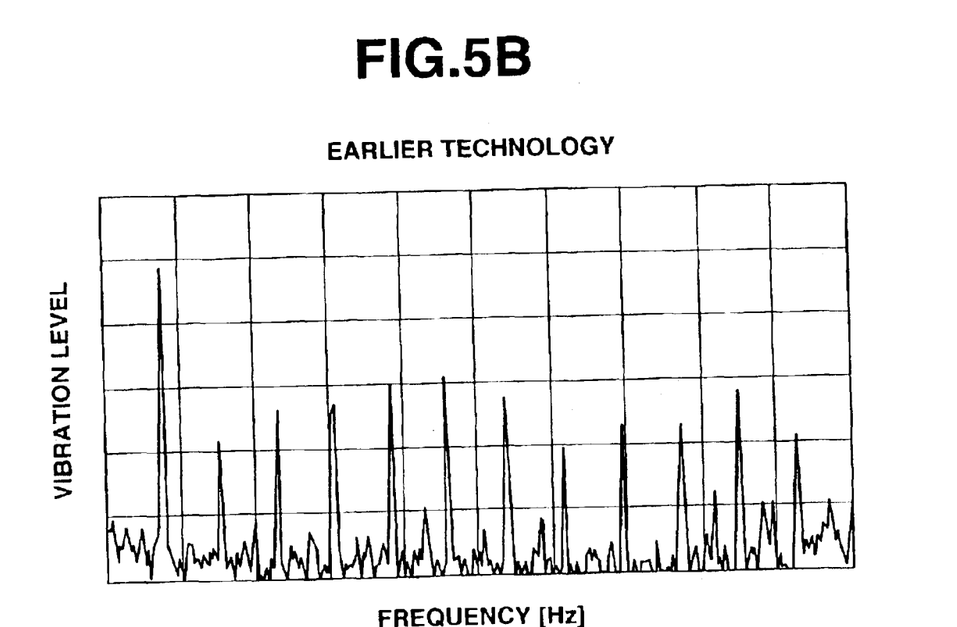
FIG. 5B is a graph showing vibration characteristics of a pump assembly according to an earlier technology.

FIG. 5A shows pump shaft vibration characteristics of the pump assembly of this embodiment. FIG. 5B shows pump shaft vibration characteristics of a corresponding pump assembly wherein cylindrical spring 9 is not provided, i.e., a pump assembly according to an earlier technology.

From FIGS. 5A and 5B, it will be seen that the pump assembly of this embodiment that is provided with cylindrical spring 9 can reduce the vibration level considerably.

Further, cylindrical spring 9 is provided to the protruded end portion of output shaft 21, it becomes possible to absorb a dimensional error that will possibly be caused when motor 2 is attached to pump housing 1 after output shaft 12 is installed on casing 2c without any play, by elastic deformation of cylindrical spring 9, and a good assembly work can be obtained.

In addition, since cylindrical spring 9 is used as a damping or elastic means for damping vibrations in the direction perpendicular to the axis of output shaft 12, it can be smaller in the thickness in the radial direction as compared with the case where another elastic member such as a coil spring, rubber is used as the damping means, thus making it possible for pump housing 1 to be more compact in size and making it higher the assembling efficiency.

The entire contents of Japanese Patent Applications P2002-014682 (filed Jan. 23, 2002) are incorporated herein by reference.

Figure 6:
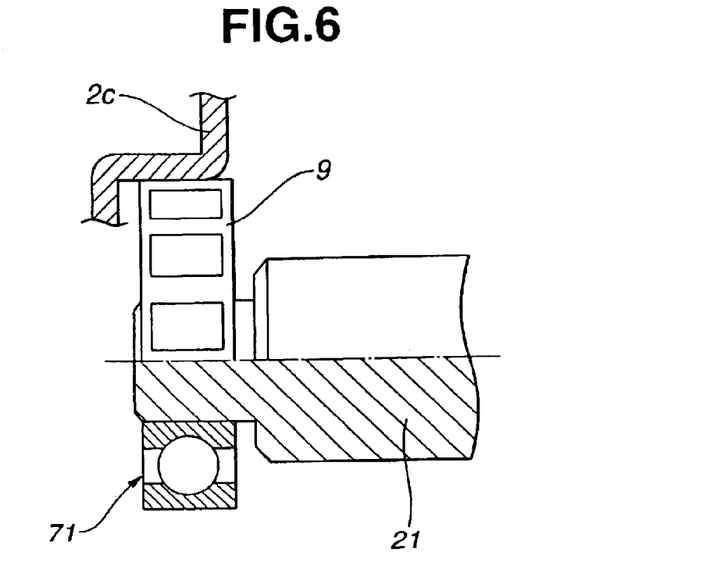
FIG. 6 is a fragmentary sectional view of a modified embodiment of the present invention.

Although the invention has been described above by reference to a certain embodiment of the invention, the invention is not limited to the embodiment described above. Modifications and variations of the embodiment described above will occur to those skilled in the art, in light of the above teachings. For example, while the embodiment has been described with respect to the case where cylindrical spring 9 is used as a damping or elastic means, another damping or elastic means such as a coil spring and ring-shaped elastic or rubber member can be used in place thereof. Further, while the damping means in the embodiment has been described and shown as being disposed between the outer circumferential periphery of terminal bearing 73 and the inner circumferential periphery of support hole section 11b, it can be disposed between output shaft 21 and rear bearing 73 since any damping means will suffice so long as it can dampen movement of output shaft 21 in the radial direction. Further, while the embodiment has been described and shown as to the case where the damping or elastic means (cylindrical spring 9) is disposed between output shaft 21 and pump housing 1, the damping means can be disposed between casing 2c and the base end portion of output shaft 21 as shown in FIG. 6. The scope of the invention is defined with reference to the following claims.

What is claimed is:

1. A pump assembly comprising:
   a pump housing;
   an electric motor attached to the pump housing and having a casing and an output shaft that protrudes into the pump housing to drive a pump within the pump housing;
   the output shaft having at least two supported portions by way of which the output shaft is rotatably supported on the casing and the pump housing, respectively; and
   a damping device interposed between one of the supported portions and one of the casing and the pump housing for damping radial vibrations of the output shaft,
   wherein the damping device includes a cylindrical spring that is deformable radially elastically.

2. A pump assembly according to claim 1, wherein the pump housing comprises a shaft receiving hole in which the output shaft is partially disposed, the shaft receiving hole has a support hole section, the supported portions include a bearing installed in the support hole section and rotatably supporting an end portion of the output shaft, and the damping device is disposed between the bearing and the support hole section of the pump housing.

3. A pump assembly according to claim 1, wherein the casing has an axial end formed with a support portion, the supported portions include a bearing installed in the support portion of the casing and rotatably supporting an end portion of the output shaft, and the damping device is disposed between the bearing and the support portion of the casing.

4. A pump assembly according to claim 1, wherein the supported portions comprise a first bearing for rotatably supporting an end portion of the output shaft on the pump housing and a second bearing for rotatably supporting another end portion of the output shaft on the casing.

5. A pump assembly according to claim 4, wherein the output shaft further comprises a supported portion that is constituted by a third bearing for rotatably supporting an intermediate portion of the output shaft on the casing.

6. A pump assembly according to claim 5, wherein the cylindrical spring is interposed between the first bearing and the pump housing.

7. A pump assembly according to claim 5, wherein the cylindrical spring is interposed between the second bearing and the casing.

8. A pump assembly according to claim 5, wherein the output shaft comprises an eccentric cam at a position between the first bearing and the third bearing, and the pump comprises a plunger pump driven by the eccentric cam.

9. A pump assembly comprising:
   a pump housing;
   an electric motor attached to the pump housing and having a casing and an output shaft that protrudes into the pump housing to drive a pump within the pump housing;
   the output shaft having at least two supported portions by way of which the output shaft is rotatably supported on the casing and the pump housing, respectively; and
   a damping device interposed between one of the supported portions and one of the casing and the pump housing for damping radial vibrations of the output shaft,
   wherein the damping device comprises a cylindrical spring in the form of a split ring and having a plurality of radially inward projections.

10. A pump assembly comprising:
    a pump housing;
    a pump disposed within the pump housing;
    an electric motor attached to the pump housing and having a casing and an output shaft that protrudes into the pump housing to drive the pump;
    a bearing unit for rotatably supporting at least two support portions of the output shaft on the pump housing and the casing, respectively; and
    an elastic device interposed between the bearing unit and one of the pump housing and the casing for damping radial vibrations of the output shaft, wherein the elastic device comprises a cylindrical spring in the form of a split ring and having a plurality of radially inward projections.

11. A pump assembly according to claim 10, wherein the pump housing comprises a shaft receiving hole in which the output shaft is partially disposed, the shaft receiving hole has a support hole section, the support portions of the output shaft are constituted by a base end portion and a protruded end portion, respectively, the bearing unit includes a bearing installed in the support hole section and rotatably supporting the protruded end portion of the output shaft, and the elastic device is disposed between the bearing and the support hole section of the pump housing.

12. A pump assembly according to claim 10, wherein the casing has a closed axial end formed with a support portion, the support portions of the output shaft are constituted by a base end portion and a protruded end portion, the bearing unit includes a bearing installed in the support portion of the casing and rotatably supporting the base end portion of the output shaft, and the elastic device is disposed between the bearing and the support portion of the casing.

13. A pump assembly according to claim 10, wherein the support portions of the output shaft are constituted by a base end portion and a protruded end portion, the bearing unit comprises a rear bearing for rotatably supporting the base end portion of the output shaft on the casing and a terminal bearing for rotatably supporting the protruded end portion of the output shaft on the pump housing.

14. A pump assembly according to claim 13, wherein the bearing unit further comprises a front bearing for rotatably supporting an intermediate portion of the output shaft on the casing.

15. A pump assembly according to claim 14, wherein the cylindrical spring is interposed between the front bearing and the pump housing.

16. A pump assembly according to claim 14, wherein the cylindrical spring is interposed between the rear bearing and the casing.

17. A pump assembly according to claim 14, wherein the output shaft comprises an eccentric cam at a position between the front bearing and the terminal bearing, and the pump comprises a plunger pump driven by the eccentric cam.

* * * * *